Patented Oct. 3, 1950

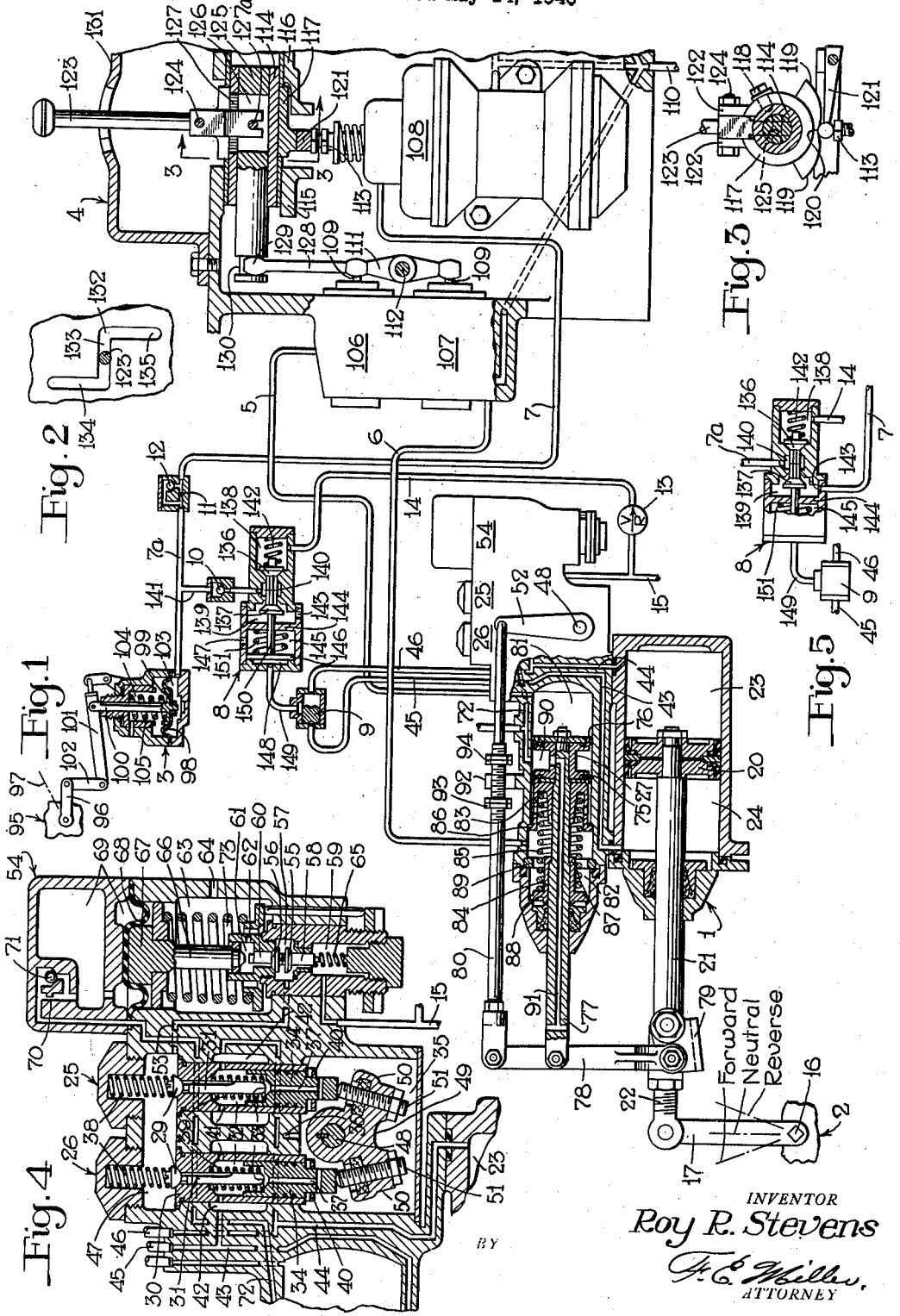

2,524,487

UNITED STATES PATENT OFFICE 2,524,487

CONTROL APPARATUS

Roy R. Stevens, Forest Hills, Pa., assignor to The Westinghouse Air Brake Company, Wilmerding, Pa., a corporation of Pennsylvania Application May 14, 1946, Serial No. 669,723

15 Claims. (Cl. 74—472)

This invention relates to control apparatus and more particularly to means for controlling the power output or speed of a prime mover such as an internal combustion engine of the Diesel type.

On ships having a prime mover operable in one direction only and a propeller which is adapted to be driven by said prime mover in either one direction or in the reverse direction through suitable reversing clutches, gear or the like, the prime mover may stall if it is operating at a sufficiently low speed or low output of power when the clutch is operated to connect said engine to the propeller, and particularly to reverse the propeller for reversing the direction of movement of the ship, and one object of the invention is the provision of improved and automatic means for obviating this difficulty.

Another object of the invention is the provision of means for automatically increasing the speed or power output of a prime mover to a sufficient degree to prevent stalling thereof when connecting it to a load, such as to the propeller on a ship.

Other objects and advantages will be apparent from the following more detailed description of the invention.

In the accompanying drawing: Fig. 1 is a diagrammatic view partly in section and partly in outline of a control apparatus embodying the invention; Fig. 2 is a partial plan view of an operator's control valve device shown partly in vertical section in Fig. 1; Fig. 3 is a sectional view taken on the line 3—3 in Fig. 1; Fig. 4 is a sectional view at an enlarged scale of a portion of a reversing motor shown in Fig. 1; and Fig. 5 is a diagrammatic view of a modification of the invention.

Description

As shown in the drawing, the control apparatus comprises a fluid pressure controlled reversing motor 1 for controlling a reversing mechanism or gear 2 adapted to connect and disconnect a prime mover, such as a Diesel engine (not shown), to a reversible ship's propeller (not shown); a throttle or speed control device 3 for said engine; and an operator's control device 4 for controlling operation of said motor through forward and reverse pipes 5 and 6, respectively, and for also controlling operation of said speed control device through a control pipe comprising portions 7, 7a. The parts of the apparatus so far enumerated may be substantially identical to corresponding parts fully disclosed in Patent No. 2,388,357, issued on November 6, 1945, to Ellis E. Hewitt; Patent No. 2,343,661, issued on March 7, 1944, to William H. Glass, and in Patent No. 2,381,222, issued on February 24, 1944, to Harry C. May, in view of which these parts will hereinafter be described only in sufficient detail to provide a clear understanding of the invention.

According to one form of the invention the control apparatus further comprises an interlock or automatic accelerating means in the form of a relay valve device 8, a double check valve device 9, a check valve 10, a device connecting portion 7, 7a of the speed control pipe and including a choke 11, and a check valve 12 arranged in a communication by passing said choke, and a reducing valve device 13 which is operative to provide in a pipe 14 fluid at a constant reduced pressure from any suitable source such as a fluid pressure supply pipe 15.

The reversing gear 2 may be of any conventional form, such as a three position clutch, having a rock shaft 16 which is operable by a reversing lever 17 to forward and reverse clutch engaging or drive positions and to an intermediate or neutral clutch disengaging position, for correspondingly engaging and disengaging the clutch. These positions are indicated by dot and dash lines and appropriate legends in Fig. 1. As applied to a ship for connecting and disconnecting an engine to and from the ship's propeller, the reversing gear in the forward position will therefore render the engine operative to turn the propeller in the direction for moving the ship forwardly, and in the reverse position will cause reverse operation of the propeller for moving the ship in the astern direction. In the neutral position of lever 17 the propeller will be disconnected from the propulsion engine.

The reversing motor 1 is provided for selectively moving the reversing lever 17 to any one of its different positions as determined by the pressure condition in control pipes 5 and 6, and comprises a casing containing a power piston 20 which is operably connected by a rod 21 and a link 22 to the end of the reversing gear control lever 17. The power piston 20 has at one side a pressure chamber 23 and at the opposite side a pressure chamber 24. When fluid under pressure is supplied to chamber 23, as will be later described, said pressure acting on piston 20 will move same in the direction of the left hand for moving the reversing gear lever 17 from neutral position toward forward position or from reverse position toward either neutral position or forward position, in accordance with the desired positioning of the clutch. When fluid pressure is supplied to chamber 24 said pressure will act on piston 20 to move the reversing gear control lever 17 in the direction of the right hand from neutral position toward the reverse position, or from the forward position toward either neutral or the reverse position, in accordance with the desired positioning of the clutch.

The pressure of fluid acting on opposite sides of the power piston 20 is controlled by a control valve comprising a forward valve device 25 and a reverse valve device 26, which devices are arranged to be controlled by the cooperative action of a pilot piston 27 and the power piston 20.

The forward and reverse valve devices 25 and 26 are of identical construction each comprising (Fig. 4) a fluid pressure supply valve 29 having a seat on one end of a bushing 30 pressed into a bore in the motor casing. The supply valve 29 has a fluted stem 31 extending through a bore in bushing 30 into a chamber 32 wherein there is provided a release valve 33 on the end of said stem. A seat for release valve 33 is provided on one end of a plunger 34 which is slidably mounted in the bushing with the outer end disposed in a chamber 35 which is open to atmosphere through a passage 36. The seat for the release valve 33 encircles a passage 37 extending through plunger 34 and opening to chamber 35. A spring 38 acts on the supply valve 29 for seating it, while a spring 39 contained in chamber 32 acts on plunger 34 for urging it out of contact with the release valve 33. A stop 40 is provided for contact by plunger 34 to limit outward movement thereof by spring 39. Chamber 32 containing the release valve 33 is open through one or more ports 41 to a chamber 42 encircling the bushing 30. In the reverse valve device 26 chamber 42 is open to a passage 43 leading to the power piston chamber 24, while in the forward valve device 25 chamber 42 is open to a passage 44 leading to power piston chamber 23, said passages being also connected, respectively, to pipes 45 and 46 leading to opposite ends of the double check valve 9. The supply valves 29 in the forward and release valve devices 25 and 26 are both contained in a chamber 47.

An operating shaft 48 extending into chamber 35 midway between the ends of the two plungers 34 carries an operating member 49 having two oppositely arranged arms 50 one disposed over each of said plungers. In each arm 50 is an adjusting screw 51 for engaging the end of the respective plunger 34. Outside of the casing an operating lever 52 (Fig. 1) is connected to shaft 48 for rocking said shaft in either direction from a neutral position in which it is shown in the drawing.

With lever 52 in a neutral position, the two adjusting screws 51 will be adjusted so that the two plungers 34 will be unseated from the respective release valves 33 by springs 39, under which condition, the two supply valves 29 will be closed by springs 38, and chambers 23 and 24 at opposite sides of the power piston 20 will be open to atmosphere through passages 44 and 43, past said release valve in the valve devices 26 and 25, respectively, and thence through passages 37 in plungers 34.

Rocking of lever 52 out of neutral position in a clockwise direction, as viewed in the drawing, will in the reverse valve device 26 move plunger 34 into seating engagement with release valve 33 for closing communication between the power piston chamber 24 and atmosphere, and a slight further rocking of said lever will then act through said valve to open the supply valve 29 whereupon fluid under pressure supplied to chamber 47, in a manner to be later described, will flow to chamber 32 and thence through chamber 42 and passage 43 to the power piston chamber 24 to move the power piston 20 in the direction of the right hand. Return of lever 52 to neutral position will, in the reverse valve device 26, permit seating of supply valve 29 by spring 38 and unseating of plunger 34 from the release valve 33 to permit release of fluid under pressure from the power piston chamber 24.

Likewise, upon movement of lever 52 out of neutral position in a counter-clockwise direction the forward valve device 25 will be operated to supply fluid under pressure to the power piston chamber 23 for moving the power piston 20 toward the left hand, while return of said lever to neutral position will permit operation of valve device 25 to open said chamber to atmosphere to permit release of fluid under pressure therefrom.

When the forward valve device 25 is operated to supply fluid under pressure to power piston chamber 23, the reverse valve device 26 will maintain power piston chamber 24 open to atmosphere, and vice versa, as will be evident.

The supply of fluid under pressure to the supply valve chamber 47 is controlled through a passage 53 by an unloading valve device 54 which comprises two oppositely seating poppet valves 55 and 56 contained in a chamber 57 to which said passage is connected. The valve 55 has a fluted stem 58 extending into a chamber 59 to which is connected the fluid pressure supply pipe 15, said valve being arranged to control supply of fluid under pressure from said pipe and chamber to chamber 57 for supply to chamber 47. The valve 56 has an oppositely arranged fluted stem 60 extending into a chamber 61 which is open to atmosphere through a port 62, a chamber 63 and a port 64 in the casing, said valve being thus arranged to open chamber 57 to atmosphere. A spring 65 in chamber 59 acts on stem 58 of the valve 55 to open said valve and to close valve 56 to permit flow of fluid under pressure from the supply pipe 15 to chamber 47 containing the supply valves 29 of the forward and release valve devices 25 and 26. Seating of valve 55 and opening of valve 56 will release fluid under pressure from chamber 47.

In chamber 62 the end of the valve stem 60 is arranged to be engaged by one end of a plunger 66 projecting from a follower head 67 which engages one side of a flexible diaphragm 68. At the opposite side of diaphragm 68 is a pressure timing chamber 69 which is open through a passage containing a choke 70 and a passage by-passing said choke and containing a check valve 71 to passage 72 leading to the pilot piston 27. Check valve 71 is arranged to permit flow of fluid under pressure through the respective passage in the direction away from chamber 69 but to prevent flow of fluid under pressure through said passage to said chamber; the choke 70 being provided to restrict or retard flow of fluid under pressure to said chamber. A regulating spring 73 in chamber 63 acts on the diaphragm 68 in opposition to pressure of fluid in chamber 69.

The pilot piston 27 comprises two spaced apart piston heads 75 and 76 connected to one end of a piston rod 77 which extends in the exterior of the casing. The outer end of piston rod 77 is operatively connected to a lever 78 at a point located intermediate the ends of the lever. One end of lever 78 is operatively connected to the power piston rod 21 through the medium of a link 79, while the opposite end is connected to one end of a reach rod 80 the opposite end of which is connected to the operating lever 52 of the forward and release valve devices 25 and 26.

The pilot piston 27 has at one side a pressure chamber 81 open to the forward control pipe 5 and at the opposite side a pressure chamber 82 open to the reverse control pipe 6. Two spring stops 83 and 84 are slidably mounted on piston rod 77 in chamber 82, and encircling said rod and bearing at opposite ends on said stops is a neutralizing spring 85 which is under initial compression. The stop 83 engages piston head 75 and has an outturned collar 86 arranged to cooperate with a shoulder in the casing to limit movement of said stop toward the right hand. The stop 84 has an inturned collar 87 at one end for engaging a shoulder on piston rod 77 so as to move said stop with the pilot piston 27 upon movement of said piston toward the right hand. The stop 84 also has a flange 88 for engaging a shoulder in the casing to limit movement of said stop toward the left hand. When the flange 88 and collar 86 on the two stops are in engagement with the respective shoulders in the casing, under the pressure of spring 85, the interengagement of collar 87 on stop 84 with piston rod 77 and of stop 83 with the pilot piston 27 will position said piston in a neutral position in which it is shown in the drawing.

The pilot piston 27 is arranged to be moved in either one direction or in the opposite direction out of neutral position by fluid under pressure supplied through either pipe 5 or pipe 6 when the other pipe is vented, by means which will be later described. Fluid under pressure supplied through pipe 5 to pressure chamber 81 will move the pilot piston 27 and stop 83 against spring 85 until said stop engages a stop ring 89 in the casing which defines a reverse position of said piston. Fluid under pressure supplied through pipe 6 to chamber 82 at the opposite side of the pilot piston 27 will move said piston and stop 84 against spring 85 until said stop engages stop ring 89 which defines a reverse position of said piston. Upon release of fluid under pressure from either pipe 5 or 6, when the other pipe is vented, spring 85 will return the pilot piston 27 to its neutral position.

Intermediate the two pilot piston heads 75 and 76 is a chamber 90 which is in constant communication with atmosphere through a passage 91 in the piston rod 77. Passage 72 connected to timing chamber 69 in the unloading valve device 54 is open to chamber 90 midway between the two piston heads 75 and 76 when the pilot piston 27 is in neutral position. When the pilot piston 27 is in its forward position the passage 72 will be open to chamber 81. In the reverse position of the pilot piston 27 passage 72 will be open to chamber 82.

The reach rod 80 extends through a jaw 92 projecting from the casing. At one side of jaw 92 the rod 80 is provided with an adjustable stop 93 and on the opposite side with another adjustable stop 94, said stops being provided for engagement with said jaw to limit movement of said rod and thereby of the pilot piston 27 relative to the power piston 20 to a degree just sufficient to open the supply valve 29 in the valve device 25 or 26, depending upon the direction of such movement.

The numeral 95 indicates a portion of a fuel supply device for the engine. This device may have an adjusting arm 96 for governing the amount of fuel supplied to the engine, and said arm may have an engine idling position, in which it is shown in the drawing, for limiting the amount of fuel supplied to the engine to a degree which will provide for idling operation thereof. The arm 91 may be moved from this idling position in a counterclockwise direction for increasing the supply of fuel to the engine; a dot and dash line 97 designating a maximum fuel supply position to provide for operation of the engine at maximum speed or power output.

The speed control device 3 is provided for adjusting the fuel control arm 96 and comprises a casing containing a movable abutment preferably in the form of a flexible diaphragm 98 which is connected to said arm through a follower 99 on one end of a rod 100, a lever 101 and a link 102. The diaphragm 98 has at one side a pressure chamber 103 and at the opposite side a non-pressure chamber 104 containing a coil spring 105 encircling rod 100 and acting on the diaphragm in opposition to pressure of fluid in chamber 103. When chamber 103 is open to atmosphere, in a manner which will be later described, the spring 105 will hold the diaphragm 98 in the position in which it is shown in the drawing for thereby holding the fuel control arm 96 in its engine idling position. When fluid is supplied to pressure chamber 103 at a pressure sufficient to overcome the opposing force of spring 105, the diaphragm 98 will be deflected upwardly and move the adjusting arm 96 out of its engine idling position in the direction of the full speed position, indicated by the dot and dash line 49. It will be seen that arm 96 may be adjusted to any position between idling position and the full speed position by providing the proper pressure of fluid in chamber 103 to act on diaphragm 98.

Pressure chamber 103 in the speed control device 3 is connected to the portion 7a of the speed control pipe the portion 7 of which is connected to the operator's control device 4. The choke 11 is arranged to restrict flow of fluid under pressure from the portion 7a of the speed control pipe to the portion 7, while the check valve 12 is adapted to permit flow of fluid under pressure at a more rapid rate in the opposite direction from the operator's control valve device 4 to the speed control device 3.

The operator's control valve device 4 comprises a casing containing forward and reverse directional selector valve devices 106 and 107 for controlling the supply and release of fluid under pressure to and from the forward and reverse control pipes 5 and 6, respectively, and a self-lapping valve device 108 for regulating or varying pressure of fluid in the speed control pipe 7, 7a.

The two selector valve devices 106 and 107, which are arranged side by side in a slightly spaced apart relation, each comprises a control plunger 109 and valve means (not shown) conditioned with said plunger in the position in which it is shown in the drawing for opening the respective pipe 5 or 6 to atmosphere. Movement of plunger 109 into the respective selector valve device 106 or 107 is adapted to open a communication for supplying fluid under pressure to the respective pipe 5 or 6 from any suitable source such as a supply pipe 110.

The two plungers 109 of the selector valve devices 106 and 107 are disposed for engagement by a lever 111 at opposite sides of a fulcrum 112 upon which said lever is mounted to operate, said fulcrum being disposed substantially mid-way between said plungers. Moving lever 111 in a counter-clockwise direction will actuate the forward selector valve device 106 to supply fluid under pressure to the forward control pipe 5 while permitting the reverse control pipe 6 to remain open to atmosphere through the reverse selector valve device 107. Moving lever 111 in a clockwise direction from the position in which it is shown in the drawing will actuate the reverse selector valve device 107 to supply fluid under pressure to the reverse control pipe 6 while the forward selector valve device 106 will maintain the forward control pipe 5 open to atmosphere. It will thus be seen that when either the forward pipe 5 or the reverse pipe 6 is supplied with fluid under pressure the other will be open to atmosphere.

The self-lapping valve device 108 may be of any suitable structure embodying a control member or plunger 113 which is operative upon downward movement from a normal position, in which it is shown in the drawing, to supply fluid to the speed control pipe 7, 7a, at a pressure proportional to the degree of such movement, and which is operative to open said pipe to atmosphere in said normal position.

A rock shaft 114 disposed above the plunger 113 and at right angles to the axis of said plunger is journaled in the casing in two spaced bearings 115 and 116. A cam element 117 is secured on shaft 114 between its bearings by means of a set screw 118, said element substantially engaging the adjacent ends of the two bearings for holding the rock shaft 114 against longitudinal movement. On the side adjacent plunger 113 the cam element 117 has two like and oppositely arranged cam surfaces 119 joined by a recess 120 which is provided to receive one side of a power transmitting member 121 the opposite side of which is in contact with plunger 113 of the self-lapping valve device. With the cam element 117 positioned for recess 120 to receive the member 121 the plunger 113 in the self-lapping valve device 108 is adapted to occupy its normal position for opening pipe 7, 7a to atmosphere. Upon rocking of the rock shaft 114 and thereby of cam element 117 in either direction from normal position one of the cam surfaces 119 will move member 121 and thereby plunger 113 in a downward direction for supplying to pipe 7, 7a fluid at a pressure proportional to the extent of such movement.

Opposite the recess 120 the cam element 117 has two spaced parallel arms 122 between which extends one end of an operator's control lever 123. A bolt 124 extends through the two arms 122 and the lever 123 to provide for rocking movement of said lever lengthwise of the rock shaft 114. Movement of lever 123 circumferentially of the rock shaft 114 will however actuate the cam element 117 for controlling the self-lapping valve device 108.

The rock shaft 114 is provided with an axial bore in which is slidably mounted a plunger 125 having a slot 126 aligned with a slot 127 through one side of said shaft. The operator's control lever 123 extends through the slot 127 into the slot 126 wherein it is connected to plunger 125 by means of a pin 127a carried by said plunger. Rocking of lever 123 in either direction from a neutral position, in which it is shown in the drawing, lengthwise of the rock shaft 114 will thus move the plunger 125 lengthwise in said shaft.

The selector valve operating lever 111 has an extension 128 the end of which is in the form of a yoke 129. The two parts of this yoke are disposed at opposite sides of plunger 125 in an annular groove or recess 130 therein, whereby the lever 111 will be rocked upon axial movement of plunger 125 in either direction from the normal or neutral position, in which it is shown in the drawing.

A cover 131 secured to the casing of the operator's control valve device 4 is provided with a slot 132 in which the operator's control lever 123 is arranged to move for controlling the sequence of operation of the forward and reverse selector valve devices 106 and 107 and of the self-lapping valve device 108. This slot has a central portion 133 providing for movement of the operator's control lever 123 lengthwise of the rock shaft 114 for controlling operation of the two selector valve devices 106 and 107, while retaining said rock shaft in a neutral position for conditioning the self-lapping valve device 108 to maintain the speed control pipe 7, 7a open to atmosphere. At one end of the portion 133 of slot 132 the lever 123 may be moved at right angles into a portion 134 of said slot for rocking the rock shaft 114 out of neutral position for actuating the self-lapping valve device 108 to supply fluid to the speed control pipe 7, 7a at a pressure dependent upon the extent of movement from the portion 133 of the slot. At the opposite end of the portion 133 of the slot the lever 123 is movable into a right angular portion 135 for rocking the rock shaft in the opposite direction from neutral position to effect, however, the same operation of the self-lapping valve device 108 to provide fluid in the speed control pipe 7, 7a at a pressure proportional to the extent of movement from the central portion 133 of the slot.

The interlock or accelerating valve device 8, constituting a part of the invention, comprises two axially and oppositely arranged poppet valves 136 and 137 contained in chambers 138 and 139, respectively, and having fluted stems engaging each other in a chamber 140 which is open to a pipe 141 connecting said device to the portion 7a of the speed control pipe. The check valve 10 is provided in pipe 141 to permit flow of fluid under pressure in the direction from the interlock valve device 8 to pipe 7a, but to prevent reverse flow. Chamber 138 is adapted to be supplied through pipe 14 with fluid at constant pressure from the reducing valve device 13, and valve 136 is arranged to control flow of such fluid to chamber 140 for supply to pipe 141 and to the portion 7a of the speed control pipe. A spring 142 in chamber 138 acts on valve 136 for urging it to a closed position and for at the same time unseating valve 137. Chamber 139 containing valve 137 is open to atmosphere through a vent port 143 and one wall of said chamber is formed by a partition 144 separating said chamber from a chamber 145 formed at one side of a piston 146. Chamber 145 is open to atmosphere through a vent port 147. At the opposite side of piston 146 is a pressure chamber 148 which is connected by a pipe 149 to the side outlet of the double check valve 9. The piston 146 is connected by a stem 150 to the valve 137, whereby upon movement of said piston in the direction of the right hand said valve will be seated and valve 136 will be opened against spring 142. A spring 151 in chamber 145 acts on piston 146 for urging it to the position as shown in the drawing to permit closing of valve 136 and opening of valve 137 by spring 142.

When the double check valve 9 is in the position in which it is shown in the drawing it closes communication between pipes 45 and 149 and opens the latter pipe to pipe 46. In an opposite position of the double check valve 9 communication will be closed between pipes 46 and 149 and the latter pipe will be opened to pipe 45. Since pipe 45 is connected through passage 43 to pressure chamber 24 at one side of the power piston 20, and pipe 46 is open to chamber 23 at the opposite side of said power piston 20 through passage 44, it will be seen that pressure chamber 148 of the interlock valve device 8 will be opened through the double check valve 9 and either pipe 45 or 46 to the one of chambers 24 or 23 which is supplied with fluid under pressure.

*Operation*

In operation, let it be initially assumed that the operator's control lever 123 is in its neutral position midway between the ends of the central portion 133 of slot 132. In this position the self-lapping valve device 108 will be conditioned to open the speed control pipe 7, 7a to atmosphere while the selector valve devices 106 and 107 will open the respective pipes 5 and 6 to atmosphere. With the speed control pipe 7, 7a open to atmosphere the speed control device 3 will be operated to move arm 96 of the fuel supply valve 95 to its engine idling position, and let it be assumed that the engine is running at idling speed. With the forward and reverse pipes 5 and 6 open to atmosphere the pilot piston 27 in the reversing motor 1 will be in its neutral position, due to the action of spring 85 on stops 83 and 84, and when so positioned the forward and reverse valve devices 25 and 26 will be conditioned to cause the power piston 20 to assume its neutral position for reasons which will become apparent hereinafter. The lever 17 of the reversing gear 2 will therefore be in its neutral position for disconnecting the engine from the device which it is intended to operate, such as a ship's propeller.

With the pilot piston 27 in its neutral position the timing chamber 69 in the unloading valve device 54 will be open to atmosphere through passage 72, chamber 90 between the two pilot piston heads 75 and 76 and passage 77 so that spring 73 in said device will position the diaphragm 68 and plunger 66 as shown in the drawing. Spring 65 will then open valve 55 and close valve 56 so as to supply fluid under pressure from the supply pipe 15 to chamber 57 and thence through passage 53 to chamber 47 in the forward and reverse valve devices 25 and 26.

Now assuming that the apparatus is employed for controlling propulsion of a ship and it is desired to move the ship in a forward direction, the operator will move lever 123 from its neutral position in portion 133 of slot 132 in the direction of the right hand to the junction with portion 135 of said slot and thereby actuate the forward selector valve device 106 to supply fluid under pressure to pipe 5 and thence to the pilot piston chamber 81 in the reversing motor 1. The pressure of fluid in chamber 81 will then move the pilot piston 27 relative to the power piston 20 in the direction of the left hand and effect operation of the forward valve device 25 to supply fluid under pressure to chamber 23 at the right hand face of the power piston 20. With chamber 24 at the opposite face of the power piston open to atmosphere through the reverse valve device 26, said power piston will then be moved in the direction of the left hand for moving the reversing lever 17 in the direction of its forward position. When the pilot piston 27 is initially moved relative to the power piston as just mentioned, it will move only until the stop nut 94 engages jaw 92 following which further movement will occur only with the power piston 20, so that the pilot piston will not open passage 72 to chamber 81 until the power piston attains a position in which the reversing lever 17 is in its forward position. When however passage 72 is opened to chamber 81 fluid under pressure will flow to the timing chamber 69 in the unloading valve device 54 and when a sufficient pressure is obtained therein to overcome the opposing force of spring 73 on diaphragm 68, said diaphragm will be deflected to close valve 55 and to open valve 56 thereby cutting off the supply of fluid under pressure to and opening to atmosphere chamber 47 in the forward valve device 25. Since the supply valve 29 in the forward valve device 25 is still open fluid under pressure will then be vented from chamber 23 to atmosphere through chambers 47, 57 and 63. Fluid under pressure is thus effective on the power piston 20 only until the reversing lever 17 obtains its forward position, and then such fluid pressure is released for relieving the reversing arm 17 and thereby the thrust bearings in the reversing gear, as in the case of a reversing clutch, of shifting force.

After the reversing gear 2 is thus operated to connect the engine to the propeller the operator may move lever 123 into the portion 135 of slot 132 for operating the shelf-lapping valve device 108 to supply fluid under pressure through the speed control pipe 7, 7a to diaphragm chamber 103 in the speed control device 3 for operating said device to adjust the speed control arm 96 to increase the speed or power output of the engine to a degree in excess of idling and corresponding to the extent of movement of said lever into the portion 135 of slot 132, whereby the engine will be operated to drive the propeller through the reversing gear 2 and thereby move the ship in a forward direction at a speed selected by the position of the operator's control lever.

When fluid under pressure is supplied to the power piston chamber 23 for operating the power piston 20 to move the reversing lever 17 to its forward position as above described, fluid under pressure will also flow from passage 44 to pipe 46 and thence past the right hand end of the double check valve 9 and through pipe 149 to chamber 148 in the interlock valve device 8, and this pressure will actuate piston 146 to close valve 137 and open valve 136. When valve 136 is thus opened fluid at the selected reduced pressure supplied to pipe 14 will flow past said valve and through pipe 141, past the check valve 10 therein, to the portion 7a of the speed control pipe and the rate of this supply with respect to the flow capacity of choke 11 for dissipating such pressure to atmosphere through pipe 7 and the self-lapping valve device 108 with the operator's control lever 123 still in the portion 133 of slot 132, will permit the pressure of fluid in diaphragm chamber 103 of the speed control device 3 to increase to a degree to cause deflection of diaphragm 98 and thereby operation of the speed control arm 96 to increase the speed of the engine to a chosen degree in excess of idling speed. It will be noted that the engine is thus automatically accelerated during operation of the reversing motor 1 to actuate arm 17 for connecting the engine to the propeller, to thereby insure that the propeller will not cause stalling of the engine.

After the engine is connected to the propeller the operation of the unloading valve device 54 to release fluid under pressure from the power piston 23 will at the same time cause a release of fluid under pressure from chamber 148 of the interlock valve device 8, whereupon spring 151 in said device will return piston 146 to the position in which it is shown in the drawing to permit closing of valve 136 and opening of valve 137 by spring 142. When the supply of fluid to the portion 7a of the speed control pipe by way of valve 136 is thus cut off the check valve 10 prevents back-flow of fluid still present in the said portion of the speed control pipe, and such pressure effective in diaphragm chamber 103 of the speed control device 3 will then be dissipated to atmosphere through choke 11 and the self-lapping valve device 108, the choke 11 acting to retard such release of fluid under pressure from the speed control device 3 and thus retard return of the engine to idling speed for a slight period of time to ensure that the engine will carry the load when its speed is finally reduced to idling. When subsequently the operator's control valve device 4 is operated to increase the speed of the engine the check valve 12 in the communication by-passing choke 1 permits a desired normal rate of flow of fluid under pressure through the speed control pipe 7, 7a to control device 3 for causing prompt acceleration thereof and the check valve 10 prevents loss of this pressure past the open valve 137 in the interlock valve device 8.

Deceleration of the engine upon movement of the operator's control lever 79 back to the portion 133 of slot 132 will of course be limited in rate by the flow capacity of choke 11 but the flow capacity of said choke is sufficient to permit a desired rate of deceleration.

Now let it be assumed that with the operator's control lever 123 in its neutral position and with the reversing gear 2 in its neutral position and with the engine running, the operator desires to move the ship in an astern direction. To accomplish this the operator will move lever 123 to the left hand end of portion 133 of slot 132 for thereby actuating the reverse selector valve device 107 to supply fluid through pipe 6 to chamber 82 at the left hand face of the pilot piston 27. The pilot piston 27 will thereby be moved in the direction of the right hand until stop nut 93 contacts jaw 92, this operation however operating the reverse valve device 26 to supply fluid under pressure to chamber 24 at the left hand face of the power piston 20. Chamber 23 at the right hand face of the power piston 20 is at this time open to atmosphere through the forward valve device 25, as a result of which, the pressure of fluid in chamber 24 will actuate said piston to move the reversing gear lever 17 from its neutral position in the direction of its reverse position. As the power piston 20 is thus moved in the direction of the right hand the pilot piston 27 will move therewith and at substantially the time the reversing lever 17 obtains its reverse position the pilot piston will open passage 72 to chamber 82 whereupon fluid under pressure will be supplied to the unloading valve device 54 to effect operation thereof in the same manner as hereinbefore described to release fluid under pressure from chamber 47 and thereby from chamber 24 to relieve the reversing lever 17 of actuating force for reasons above mentioned.

The engine is now connected through the reversing gear 2 with the ship's propeller for driving same, and during operation of the reversing motor 1 to effect such connection, the pressure of actuating fluid in chamber 24 will be effective through pipe 45, past the double check valve 9 and through pipe 149 in chamber 148 of the relay valve device 8. Piston 146 of the relay valve device 8 will thereby be operated to close valve 137 and to open valve 136 whereupon fluid at the reduced pressure present in pipe 14 will become effective through the portion 7a of speed control pipe in chamber 103 of the speed control device 3 for actuating said device to accelerate the engine during the time the engine is being connected to the propeller for preventing stalling of the engine. When however the unloading valve device 54 is operated to release fluid under pressure from the power piston chamber 24, a release of fluid under pressure from chamber 148 in the relay valve device 8 will also occur to permit operation of said device to cut off the supply of fluid from pipe 14 to the speed control device 3. The fluid pressure in chamber 103 of the speed control device 3 will then be dissipated to atmosphere through choke 11 and the self-lapping valve device 108, with the operator's control lever 123 still in the portion 133 of slot 132, due to which the speed control device 3 will operate to return lever 48 to idling position to permit the speed of the engine to reduce to idling.

After the reverse gear 2 is engaged for astern movement of the ship as just described, the operator will move lever 123 out of the portion 133 of slot 132 and into the portion 134 to cause operation of the speed control device 3 to accelerate the engine or to increase the degree of power output thereof to a degree corresponding to the desired position of the operator's control lever for causing movement of the ship in the astern direction at a corresponding speed.

Now let it be assumed that with the engine driving the ship in a forward direction with the control lever 123 in a portion 135 of slot 132 the operator desires to reverse the direction of ship movement without first waiting for the ship and the ship's propeller to come to a stop, under which condition the engine power required to reverse the propeller will be greater than in starting the propeller from rest as hereinbefore considered, and as a result, the possibility of stalling the engine will be correspondingly greater.

To thus reverse the direction of ship movement the operator will move lever 123 out of the portion 135 of slot 132 to the left hand end of the portion 133 for thereby operating the forward pilot piston selector valve device 106 to open chamber 81 to atmosphere and for at the same time operating the reverse selector valve device 107 to supply fluid under pressure to chamber 82 at the opposite side of the pilot piston. The pilot piston 27 will then move toward the right hand until stop 93 engages jaw 92 and this movement will first open passage 72 to chamber 90 between the pilot piston heads 75 and 76 for thereby venting to atmosphere fluid under pressure from chamber 69 in the unloading valve 54, to permit operation of said device to supply fluid under pressure to chamber 47. The forward valve device 25 will then be operated to open chamber 23 to atmosphere past the respective release valve 33, and the reverse valve device 26 will be operated to supply fluid under pressure from chamber 47 to chamber 24 at the left hand side of power piston 20 for moving said piston from the left hand end of the cylinder in the direction of the right hand end for pulling the reversing lever 17 out of its forward position and moving it toward its reverse position. The pilot piston 27 will move with the power piston 20 as above mentioned, and when the latter piston obtains the neutral position, in which it is shown in the drawing, the supply valve 29 in the reverse valve device 26 will still be open by the pilot piston 27 so as to maintain the supply of fluid under pressure to the power piston chamber 24 so that said piston will continue movement toward the right hand end of its cylinder for thereby pulling the reversing lever 17 past its neutral position toward its reverse position. This movement of the pilot piston 27 and power piston will continue until the pilot piston opens passage 72 to chamber 82 which will occur at substantially the time the reversing lever 17 obtains its reverse position, and when it does occur, fluid under pressure will flow from chamber 82 to chamber 69 in the unloading valve device 54 for effecting operation thereof to open the power piston chamber 24 to atmosphere for thereby relieving the power piston 20 of pressure of fluid and in turn the reversing lever 17 of actuating force hereinbefore mentioned.

While the power piston 20 is being actuated as just described to pull the reversing lever 17 from its forward position to its reverse position fluid under pressure effective in chamber 24 will also be effective through pipe 45, the double check valve 9 and pipe 149 in the interlock valve device 8 to effect operation of said device to supply fluid at the constant pressure in pipe 14 to diaphragm chamber 103 in the speed control device 3 for actuating said device to accelerate the engine as above mentioned, and the engine will thus be maintained operating at the accelerated speed until after the reversing lever 17 obtains its reverse position and the fluid under pressure is released from the power piston chamber 24 as before described. The operator by moving lever 123 into portion 134 of slot 132 may then accelerate the engine to any desired degree for initially stopping the ship from forward movement, if the ship is still moving forward, and for then causing movement in the astern direction at a desired speed.

If the operator desires to reverse the direction of movement of the ship from astern to forward in as short a time as possible, he will move lever 123 from whatever position it may in the portion 134 of slot 132 to the right hand end of portion 133 for thereby effecting operation of the reversing motor 1 to move the reversing lever 17 from its reverse position to its forward position, and during this operation the interlock valve device 8 will be operated to cause acceleration of the engine to prevent stalling thereof at the time the reversely operating propeller is connected to said engine, as will be apparent from the above description of reversing from forward to astern. After the propeller is thus connected to the engine the operator may then move the control lever 123 into the portion 135 of slot 132 for accelerating the engine.

It will now be seen that the interlock valve device 8 operating in unison with the power piston 20 will automatically cause acceleration of the engine while being connected to the propeller so as to prevent the engine from stalling in case it is operating at a sufficiently low speed.

The possibility of stalling the engine is greater when reversing the propeller from operation in one direction to operation in the reverse direction, than in starting the propeller from rest, since until the ship is brought to a stop the inertia of the propeller and action of water against the propeller opposes operation of the engine. In either case however the interlock valve device 8 will accomplish the desired end.

*Description Fig. 5*

If desired the structure shown in Fig. 5 of the drawing may be employed in place of the check valve 10 and the device including choke 11 and check valve 12 for accomplishing the same result. According to this modification the portion 7a of the speed control pipe is connected directly to chamber 140 in the interlock valve 8 while the portion 7 is connected to the vent port 143 from chamber 139. In operation, when the reversing gear lever 17 is being moved to either its forward or reverse position the interlock valve device 8 will be operated in the same manner as hereinbefore described to establish communication from the fluid pressure supply pipe 14 to the portion 7a of the speed control pipe for supplying fluid under pressure to the speed control device 3 to cause acceleration of the engine. When the reversing operation is completed however, the interlock valve device 8, still operating in the same manner as before described, will cut off the supply of fluid under pressure to the speed control device 3 and open portion 7a of the speed control pipe to portion 7 to permit the engine speed to reduce to idling, if the operator's control lever 123 is still in the portion 133 of slot 132. Upon subsequent operation of the operator's control device to control engine speed, the supply and release of fluid under pressure to and from the speed control device 3 will occur past valve 137 in the interlock valve device 8, as will be apparent.

*Summary*

It will now be seen that I have provided a control apparatus which is automatically operative upon connecting a load to a prime mover to prevent stalling or stopping of the prime mover as might occur if the prime mover were operating at a sufficiently low speed or low output of power.

Having now described my invention, what I claim as new and desire to secure by Letters Patent, is:

1. A control apparatus comprising in combination mechanism for connecting a prime mover to a load, a speed control element for said prime mover having an idling position, speed control means operable by fluid under pressure to move said element out of said idling position to accelerate said prime mover, a second means for effecting operation of said mechanism, control means operable to supply fluid under pressure to said speed control device, and means for effecting operation of said second means and of said control means in unison.

2. An apparatus for effecting operation of mechanism to connect a prime mover to a load and for also controlling adjustment of a speed control element having an idling position and movable out of said idling position to accelerate said prime mover, said apparatus comprising in combination, speed control means operable by fluid under pressure to move said element out of said idling position, a second means for effecting operation of said mechanism, a speed control pipe for conveying fluid under pressure to and from said speed control device, an operator's control device for supplying fluid under pressure to and for releasing fluid under pressure from said speed control pipe, a fluid pressure control device for also supplying fluid under pressure to said speed control pipe, means cooperative with said fluid pressure control device upon operation thereof to supply fluid under pressure to said pipe, with said operator's control device conditioned for releasing fluid under pressure from said pipe, to cause an increase in pressure in said pipe for actuating said speed control element, and means for automatically effecting operation of said fluid pressure control device in unison with said second means.

3. An apparatus for effecting operation of mechanism to connect a prime mover to a load and for also controlling adjustment of a speed control element having an idling position and movable out of said idling position to accelerate said prime mover, said apparatus comprising in combination, speed control means operable by fluid under pressure to move said element out of said idling position, a second means for effecting operation of said mechanism, a speed control pipe for conveying fluid under pressure to and from said speed control device, an operator's control device for supplying fluid under pressure to and for releasing fluid under pressure from said speed control pipe, a source of fluid under pressure, interlock means controlling communication through said pipe and operable selectively to either open said communication or to close said communication and supply fluid under pressure from said source to said speed control means, and means for automatically effecting operation of said interlock means to close said communication in unison with operation of said second means, and to open said communication subsequent to operation of said second means.

4. An apparatus for effecting operation of mechanism to connect a prime mover to a load, and for also controlling adjustment of a speed control element having an idling position and movable out of said idling position to accelerate said prime mover, said apparatus comprising in combination, a first means for effecting operation of said mechanism, a second means for moving said speed control element out of idling position, an operator's control device for effecting operation of said first means and for also effecting operation of said second means to move said speed control element to said idling position and also out of said idling position, accelerating means operable upon operation of said first means to effect operation of said mechanism to automatically effect operation of said second means to move said speed control element out of idling position with said operator's control device conditioned to effect operation of said second means to move said speed control element to said idling position, and means controlled by said first means operable upon connecting said prime mover to said load to effect operation of said accelerating means to automatically effect operation of said second means to move said speed control element to said idling position.

5. An apparatus for effecting operation of mechanism to connect a prime mover to a load and for also controlling a speed control element for said prime mover having an idling position and movable out of said idling position to accelerate said prime mover, said apparatus comprising in combination, a motor operable by fluid under pressure to effect operation of said mechanism, another motor operable by fluid under pressure to effect movement of said speed control element out of idling position, and an operator's control device operable to effect a supply of fluid under pressure to both of said motors in unison.

6. An apparatus for effecting operation of mechanism to connect a prime mover to a load and for also controlling a speed control element for said prime mover having an idling position and movable out of said idling position to accelerate said prime mover, said apparatus comprising in combination, a motor operable by fluid under pressure to effect operation of said mechanism, speed control means operable by fluid at a chosen pressure to effect operation of said speed control element to accelerate said prime mover to a chosen degree, a source of fluid at said chosen pressure, interlock means operable by fluid under pressure to supply fluid under pressure from said source to said speed control means, and operable upon release of fluid under pressure to cut off the supply of fluid under pressure to said speed control means, means for releasing fluid under pressure from said speed control means upon operation of said interlock means to cut off the supply of fluid under pressure thereto, an operator's control device operable to effect a supply of fluid under pressure to said motor and to said interlock means in unison, and means associated with said motor and operable upon connecting said load to said prime mover to release fluid under pressure from said interlock means.

7. An apparatus for effecting operation of mechanism to connect a prime mover to a load and for also controlling a speed control element for said prime mover having an idling position and movable out of said idling position to accelerate said prime mover, said apparatus comprising in combination, a motor operable by fluid under pressure to effect operation of said mechanism, speed control means operable by fluid at a chosen pressure to effect operation of said speed control element to accelerate said prime mover to a chosen degree, a source of fluid at said chosen pressure, interlock means operable by fluid under pressure to supply fluid under pressure from said source to said speed control means, and operable upon release of fluid under pressure to cut off the supply of fluid under pressure to said speed control means, and to release the fluid pressure therefrom, an operator's control device operable to effect a supply of fluid under pressure to said motor and interlock means in unison, and means associated with said motor operable upon connecting said load to said prime mover to release fluid under pressure from said interlock means.

8. An apparatus for effecting operation of mechanism to connect a prime mover to a load and for also controlling a speed control element for said prime mover having an idling position and movable out of said idling position to accelerate said prime mover, said apparatus comprising in combination, a motor operable by fluid under pressure to effect operation of said mechanism, an operator's control device operable to effect a supply of fluid under pressure to said motor, another motor operable by fluid under pressure to effect movement of said speed control element out of idling position, and valve means operable by fluid under pressure supplied to actuate the first named motor to supply fluid under pressure to said other motor.

9. An apparatus for effecting operation of mechanism to connect a prime mover to a load and for also controlling a speed control element for said prime mover having an idling position and movable out of said idling position to accelerate said prime mover, said apparatus comprising in combination, a motor operable by fluid under pressure to effect operation of said mechanism, another motor operable by fluid under pressure to effect movement of said speed control element out of idling position, means operable upon release of fluid under pressure from said other motor to move said speed control element to said idling position, an operator's control device operable to effect a supply of fluid under pressure to both of said motors, and means controlled by the first named motor operable upon connecting said load to said prime mover to release fluid under pressure from said other motor.

10. An apparatus for effecting operation of mechanism to connect a prime mover to a load and for also controlling a speed control element for said prime mover having an idling position and movable out of said idling position to accelerate said prime mover, said apparatus comprising in combination, a motor operable upon supply of fluid under pressure to a chamber to effect operation of said mechanism, means including an operator's control device for effecting a supply of fluid under pressure to said chamber, means controlled by said motor controlling said supply of fluid under pressure to said chamber and operable upon connecting said load to said prime mover to cut off said supply and to release fluid under pressure from said chamber, another motor operable by fluid under pressure to effect movement of said speed control element out of idling position and including means for moving said speed control to said idling position upon release of fluid under pressure, and means operable upon supply and release of fluid under pressure to and from said chamber to supply and release, respectively, fluid under pressure to and from said other motor.

11. An apparatus for moving a member to a drive position for connecting a prime mover to a load and for also controlling a speed control element for said prime mover having an idling position and movable out of said idling position to accelerate said prime mover, said apparatus comprising in combination, a first motor operable by fluid under pressure to move said member to said drive position, a speed control pipe, a second motor operable upon supply of fluid under pressure to said pipe to move said speed control element out of said idling position and upon release of fluid under pressure from said pipe to move said speed control element to said idling position, an operator's control device for effecting a supply of fluid under pressure to said first motor and for at the same time opening said speed control pipe to atmosphere, and also operable to supply fluid under pressure to said speed control pipe, interlock means operable upon operation of said first motor to move said member to said drive position, to supply fluid under pressure to said pipe and operable in said drive position to cut off the supply of fluid under pressure to said pipe, and means for restricting release of fluid under pressure from said pipe through said operator's control device, upon operation of said interlock means to supply fluid under pressure to said pipe, to a degree to render pressure of fluid in said pipe effective to cause operation of said second motor to move said speed control element out of said idling position.

12. An apparatus for moving a member to a drive position for connecting a prime mover to a load and for also controlling a speed control element for said prime mover having an idling position and movable out of said idling position to accelerate said prime mover, said apparatus comprising in combination, a first motor operable by fluid under pressure to move said member to said drive position, a speed control pipe, a second motor operable upon supply of fluid under pressure to said pipe to move said speed control element out of said idling position and upon release of fluid under pressure from said pipe to move said speed control element to said idling position, an operator's control device for effecting a supply of fluid under pressure to said first motor and for at the same time opening said speed control pipe to atmosphere, and also operable to supply fluid under pressure to said speed control pipe, a source of fluid under pressure, and interlock means operable upon operation of said first motor to move said member to said drive position, to close communication thru said pipe to said operator's control device and to supply fluid under pressure from said source to said second motor and operable in said drive position to open said communication and to cut off the supply of fluid under pressure from said source to said second motor.

13. An apparatus for controlling a reversing element having forward and reverse positions for connecting a prime mover to drive a load in either one direction or in the opposite direction and for also controlling a speed control element for said prime mover having an idling position and movable out of said idling position to accelerate said prime mover, said apparatus comprising in combination, reversing means for moving said reversing element to either said forward or reverse position, speed control means for moving said speed control element to and out of said idling position, an operator's control device having one position for effecting operation of said reversing means to move said reversing element to its forward position and having another position for effecting operation of said reversing means to move said reversing element to its reverse position, interlock means operable upon movement of said operator's control device to either of its positions to effect operation of said speed control means to move said speed control element out of said idling position, and means controlled by said reversing means operable in the ahead and reverse positions of said reversing element to effect operation of said interlock means and thereby of said speed control means to effect movement of said speed control element to said idling position.

14. An apparatus for controlling a reversing element having forward and reverse positions for connecting a prime mover to drive a load in either one direction or in the opposite direction and for also controlling a speed control element for said prime mover having an idling position and movable out of said idling position to accelerate said prime mover, said apparatus comprising in combination, a reversing motor including a power piston connected to said reversing element and adapted to be operated by fluid under pressure acting on one face to move said reversing element to said forward position and by fluid under pressure acting on the opposite face to move said reversing element to said reverse position, an operator's control device having positions corresponding to the positions of said reversing element, valve means operable upon movement of said control device to its different positions to supply fluid under pressure to the face of said piston for moving said reversing element to the position corresponding to that of said control device and for at the same time releasing fluid under pressure from the opposite face of said piston, a speed control pipe, speed control means operable upon supply of fluid under pressure to said pipe to move said speed control element out of said idling position and operable upon establishing substantially atmospheric pressure in said pipe to move said speed control element to said idling position, interlock means operable by fluid under pressure to supply fluid under pressure to said pipe and operable upon release of fluid under pressure to cut off the supply of fluid under pressure to said pipe, means cooperative with said valve means to supply fluid under pressure to said interlock means upon supply of fluid under pressure to said chambers, means controlled by said piston operable with said reversing element in said forward and reverse positions to release fluid under pressure from said interlock means, and means for releasing fluid under pressure from said pipe upon operation of said interlock means to cut off the supply of fluid under pressure to said pipe.

15. An apparatus for controlling a reversing element having forward and reverse positions for connecting a prime mover to drive a load in either one direction or in the opposite direction and for also controlling a speed control element for said prime mover having an idling position and movable out of said idling position to accelerate said prime mover, said apparatus comprising in combination, a reversing motor including a power piston connected to said reversing element and adapted to be operated by fluid under pressure acting on one face to move said reversing element to said forward position and by fluid under pressure acting on the opposite face to move said reversing element to said reverse position, an operator's control device having positions corresponding to the positions of said reversing element, valve means operable upon movement of said control device to its different positions to supply fluid under pressure to the face of said piston for moving said reversing element to the position corresponding to that of said control device and for at the same time releasing fluid under pressure from the opposite face of said piston, a speed control pipe, speed control means operable upon supply of fluid under pressure to said pipe to move said speed control element out of said idling position and operable upon establishing substantially atmospheric pressure in said pipe to move said speed control element to said idling position, interlock means operable by fluid under pressure to supply fluid under pressure to said pipe and operable upon release of fluid under pressure to cut off the supply of fluid under pressure to said pipe, means cooperative with said valve means to supply fluid under pressure to said interlock means upon supply of fluid under pressure to said chambers, means controlled by said piston operable with said reversing element in said forward and reverse positions to release fluid under pressure from said interlock means, said operator's control device in both of its above named positions opening said pipe to atmosphere and being operable upon movement out of either of said positions to supply fluid under pressure to said pipe, and a choke for restricting release through said operator's control device when in both of its above named positions of fluid under pressure supplied to said pipe by said interlock means, to a degree to render such pressure effective to operate said speed control means to move said speed control element out of said idling position.

ROY R. STEVENS.

REFERENCES CITED

The following references are of record in the file of this patent:

UNITED STATES PATENTS

| Number | Name | Date |
| --- | --- | --- |
| 2,321,098 | Morse | June 8, 1943 |
| 2,326,911 | Aikman | Aug. 17, 1943 |
| 2,395,202 | Stevens et al. | Feb. 19, 1946 |
| 2,404,545 | Stevens | July 23, 1946 |
| 2,406,264 | Stevens | Aug. 20, 1946 |
| 2,413,390 | Stevens | Dec. 31, 1946 |